United States Patent [19]

Brockmeyer et al.

[11] Patent Number: 4,975,191

[45] Date of Patent: Dec. 4, 1990

[54] CERAMIC FOAM FILTER

[75] Inventors: Jerry W. Brockmeyer, Hendersonville; Leonard S. Aubrey, Arden; James E. Dore, Hendersonville, all of N.C.

[73] Assignee: Swiss Aluminium Ltd., Chippis, Switzerland

[21] Appl. No.: 371,195

[22] Filed: Jun. 26, 1989

Related U.S. Application Data

[62] Division of Ser. No. 29,184, Mar. 23, 1987, Pat. No. 4,885,263.

[51] Int. Cl.$^5$ .................. B01D 39/20; C04B 38/06
[52] U.S. Cl. ................... 210/510.1; 501/80; 501/81; 501/88; 501/89
[58] Field of Search .......... 501/88, 80, 81, 89; 264/44; 210/510.1, 506

[56] References Cited

U.S. PATENT DOCUMENTS

| | | | |
|---|---|---|---|
| 3,090,094 | 5/1963 | Schwartzwalder | 264/44 |
| 3,833,386 | 9/1974 | Wood et al. | 264/44 X |
| 3,877,973 | 4/1975 | Ravault | 264/44 |
| 3,907,579 | 9/1975 | Ravault | 264/44 X |
| 3,939,002 | 2/1976 | Washburne | 501/81 |
| 4,004,933 | 1/1977 | Ravault | 264/44 X |
| 4,024,212 | 5/1977 | Dore et al. | 264/44 |
| 4,396,565 | 8/1983 | Tomita et al. | 264/44 |
| 4,533,388 | 8/1985 | Tyler et al. | 75/76 |
| 4,537,627 | 8/1985 | Tyler et al. | 75/76 |
| 4,610,832 | 9/1986 | Brockmeyer | 210/510.1 X |
| 4,664,858 | 5/1987 | Kido et al. | 264/44 |
| 4,708,740 | 11/1987 | Tungatt et al. | 75/76 |

FOREIGN PATENT DOCUMENTS 1106468  5/1986  Japan ..................... 264/44

*Primary Examiner*—Karl Group
*Attorney, Agent, or Firm*—Bachman & LaPointe

[57] ABSTRACT

An improved ceramic foam filter for use in filtering molten metal prepared from a ceramic slurry containing silicon carbide and a colloidal silica binder. The filter has a solids content of at least 50% silicon carbide and at least 3% of silica.

3 Claims, No Drawings

CERAMIC FOAM FILTER

This is a division, of application Ser. No. 029,184 filed Mar. 23. 1987.

BACKGROUND OF THE INVENTION

The present invention is drawn to an improved ceramic foam filter for use in filtering molten metal, especially iron base alloys, and a process for preparing same. More particularly, the present invention relates to a ceramic foam filter having improved properties especially with respect to the filtration of iron and iron base alloys to the provision of rapid priming with respect thereto, and not being reactive therein.

It is known in the art to employ porous ceramic foam materials to filter molten metal especially aluminum, as described for example in U.S. Pat. Nos. 3,893,917, 3,947,363, 3,962,081, 4,024,056, 4,024,212, 4,075,303, 4,265,659, 4,342,644 and 4,343,704. The production materials for these filters comprise primarily a phosphate bonded refractory material, having certain other additions, which has been fired to a temperature of about 2000° F. in order to mature the bond. While this type of refractory is suitable for use in the aluminum industry and easily withstands most aluminum alloys which are typically cast at about 1300° F., it is unsuitable for many other potential applications due to low strength and poor chemical resistance and poor high temperature stability.

Naturally, it would be highly desirable to develop a material which maintains the favorable properties of the ceramic foam material heretofore known, namely, high porosity, low pressure drop, high geometric surface area and tortuous flow path, but which overcomes the foregoing difficulties of strength, chemical durability and temperature resistance. In addition, it is highly desirable to develop a material which could be relatively simply produced and used in a number of applications especially high temperature applications, such as for the filtration of ferrous metals.

U.S. Pat. No. 4,610,832 describes an improved ceramic foam filter and a process for preparing same particularly useful for high temperature applications such as ferrous or steel filtration based on the use of an aqueous slurry of a thixotropic ceramic composition including a gelled alumina hydrate binder. It has been found that for certain applications, specialized running and gating systems are needed to insure priming of this filter, although said filter does represent a significant improvement.

It is therefore a principal object of the present invention to provide an improved ceramic foam filter and a process for preparing same.

It is a further object of the present invention to provide an improved ceramic foam filter and process as aforesaid which is inexpensive and easy to perform and which results in a filter having desirable and indeed improved properties.

It is still a further object of the present invention to provide an improved filter and process as aforesaid which overcomes the shortcomings of phosphate binders and which provides a filter which is readily primed and has improved thermal properties.

Further objects and advantages of the present invention will appear hereinbelow.

SUMMARY OF THE INVENTION

In accordance with the present invention the foregoing objects and advantages are readily obtained.

The present invention provides an improved ceramic foam filter and process for preparing same which is characterized by excellent physical properties especially high thermal conductivity, and by rapid priming which respect to iron and iron base alloys, and which avoids the shortcomings of phosphate binders especially thermal/chemical instability resulting in phosphorous pick-up in the molten metal.

The improved ceramic foam filter of the present invention is prepared from a ceramic slurry containing silicon carbide and a colloidal silica binder which comprises an open cell structure with a plurality of interconnected voids surrounded by a web of said ceramic, said filter having a solids content of at least 50% silicon carbide and at least 3% silica, preferably 3 to 15% silica. Other ceramic materials may readily be added to the slurry, such as alumina.

In addition, the present invention resides in a process for preparing a ceramic foam filter for filtering molten metal which comprises: providing a reticulated, organic polymer foam; impregnating said foam with an aqueous slurry of a thixotropic ceramic composition including silicon carbide with a colloidal silica binder, said composition having a solids content of at least 50% silicon carbide and at least 3% silica, preferably 3 to 15% silica; drying and heating said impregnated polymer foam to remove the organic components therefrom, and firing at an elevated temperature to produce said ceramic foam filter.

The process and filter of the present invention obtains significant advantages in the art especially with respect to the filtration of iron and iron base alloys. The colloidal silica has been found to have a wetting effect on the final product with respect to iron and iron base alloys and therefore obtains rapid priming in the filtration of molten iron and iron base alloys. This represents a significant advantage in the art.

Furthermore, the present invention is not characterized by the shortcomings of phosphate binders. The use of phosphate binders adds an undesirable impurity to the melt in the filtration of iron and iron base alloys. Firstly, the colloidal silica binder of the present invention is not readily soluble in the iron and iron base alloy melt. Further, iron and iron base alloy melts are more tolerant of silicon than phosphorus. This is a particular advantage if metal is reclaimed from the spent filter by placing the spent filter in the melt which is a common practice. Furthermore, the filter of the present invention is economical and has excellent physical properties, especially high thermal conductivity which provides good thermal shock resistance and prevents thermal mechanical failure of the filter.

Further features of the present invention will appear hereinbelow.

DETAILED DESCRIPTION

In accordance with the present invention, the ceramic foam filter is prepared from an open cell, preferably hydrophobic flexible foam material having a plurality of interconnected voids surrounded by a web of said flexible foam material. Typical materials which may be used include the polymeric foams such as the preferred polyurethane and the cellulosic foams. Generally, any combustible organic plastic foam may be used which has resilience and the ability to recover to original shape. The foam must burn out or volatilize at below the firing temperature of the ceramic material which is employed.

The aqueous ceramic slurry which is employed should be thixotropic, have a relatively high degree of fluidity and be comprised of an aqueous suspension of the desired ceramic material.

The silicon carbide component preferably has a grain size of −325 mesh, i.e. less than 45 microns; however one can readily utilize silicon carbide with a grain size of −100 mesh, i.e. 150 microns or less. The ability to use fine grain size ceramic material, such as process fines of 10 microns or less, represents a significant advantage particularly in view of cost considerations. The solids content of the composition must be at least 50% silicon carbide with a maximum of 97% silicon carbide.

One can readily employ additional ceramic materials in combination with the silicon carbide component. Alumina is a particularly preferred additive and when used should be used with a grain size of −325 mesh, i.e. less than 45 microns. Naturally, other ceramic materials may readily be employed such as zirconia, chromia, cordierite, mullite, etc.

It is an advantage of the present invention that the use of a detrimental phosphate binder is not necessary in accordance with the present invention. This results in the omission of the detrimental phosphate component of the filter which has a tendency to add undesirable phosphate impurities to iron and iron base alloy melts. The binder of the present invention is a colloidal silica binder which is used as an aqueous dispersion of particles using from 10 to 50% water. The colloidal dispersion is a stable, nonsettling suspension with a particle size of 1 micron or less. The colloidal silica component provides the binder and due to the colloidal nature of the dispersion imparts a desirable thixotropy.

Naturally, other additives may be employed either as an additional binder or for other desirable reasons preferably, for example, one may readily use montmorillonite, Aquathix which is a trademark of Tenneco Chemicals for a water soluble polysaccharide, bentonite, kaolin and the like.

In accordance with the process of the present invention, one provides a reticulated, organic polymer foam and impregnates the foam with the aqueous slurry. Detailed procedures for preparing ceramic foam for molten metal filters are described in U.S. Pat. Nos. 3,962,081, 4,075,303 and 4,024,212, the disclosures of which are hereby incorporated by reference.

The flexible foam material is impregnated with the aqueous ceramic slurry so that the fiber-like webs are coated therewith and the voids are filled therewith. Normally, it is preferred to simply immerse the foam in the slurry for a short of time sufficient to insure nearly complete impregnation of the foam. The pore size of the polymeric material may conveniently be three pores per inch or greater. The larger pore sizes in the range of 3-25 pores per inch have been found to be particularly advantageous for iron and iron base alloy filtration in view of the higher total material throughput, although one could readily utilize smaller pore sizes, up to 50 ppi, for example.

The impregnated foam is then compressed to expel a portion of the slurry while leaving the fiber-like web portion coated therewith and with a plurality of blocked pores throughout the body to increase flow path tortuosity, i.e. homogeneously distributed throughout the ceramic body rather than grouped together. For those cases in which maximum throughput with a lesser degree of filtration is desirable, a relatively coarse pore size with very few pore blockages is preferred. In a continuous operation, for example, one may pass the impregnated foam through a preset roller to effect the desired expulsion of the slurry from the foam and leave the desired amount impregnated therein. Naturally, this may be done manually by simply squeezing the flexible foam material to the desired extent. At this stage, the foam is still flexible and may if desired be formed in configurations for suitable filtration tasks, i.e., into curved plates, hollow cylinders, etc. It is necessary to hold the formed foam is position by conventional means until the organic substrate is decomposed. The impregnated foam is then dried by any suitable means, such as air drying, accelerated drying at a temperature of from 100° to 700° C. for from 15 minutes to 6 hours, or by microwave drying. Air drying may be achieved in from 8 to 24 hours. After drying the material is fired at an elevated temperature in excess of 2000° F. to form the ceramic foam filter with temperatures of up to 2500° F. being suitable. After firing, the resultant product is characterized by a plurality of blocked pores as described above. Firing time at or near the peak temperature is at least 15 minutes and generally at least 1 hour and generally less than 10 hours. Total firing times including heating to and cooling from the peak temperature can, of course, vary widely depending on the type furnace used.

The resultant product is as characterized hereinabove and has significant advantages as discussed hereinabove.

Naturally, additional inorganic additives may readily be used in order to obtain particularly preferred properties, such as for example, sinteringaids, grain growth inhibitors or inorganic rheological aids. Other organic additives may also be beneficially employed including, for example, temporary binders and rheological aids.

In accordance with the present invention, the specific features will be more readily understandable from a consideration of the following data.

EXAMPLE I

A thixotropic ceramic slurry was prepared from the following formula:
78.83 lbs. of silicon carbide (approximately 50.94%)
9.64 lbs. of water (approximately 6.23%)
28.91 lbs. of alumina (approximately 18.68%)
35.76 lbs. of colloidal silica in aqueous suspension (approximately 23.11%)
1.48 lbs. of montmorillonite (approximately 0.96%)
0.12 lbs. of Aquathix (approximately 0.08%).

The foregoing composition provided a solids content as set forth below:
silicon carbide—solids 78.83 lbs.—65.65%
alumina—solids 28.91 lbs.—24.08%
colloidal silica—solids 10.73 lbs.—8.94%
montmorillonite—solids 1.48 lbs.—1.23%
Aquathix—solids 0.12 lbs.—0.10%

The aforesaid thixotropic by slurry was used to impregnate nominal 10 pore per inch, open cell flexible polyurethane foam having a size of 3 by 3 inches square so that the fiber-like webs were coated therewith and the voids filled therewith. Impregnation was accomplished by immersing the foam samples in the slurry and using present rolls to compress the foam and expel a portion of the slurry while leaving the fiber-like web portion coated therewith and with a plurality of blocked pores throughout the body to increase flow path tortuosity.

The resultant impregnated foams were dried and heated to remove the organic component therefrom and fired at approximately 2100° F. for 1 hour. The resultant ceramic foam samples were characterized by an open cell structure having plurality of interconnected voids surrounded by a web of ceramic.

EXAMPLE II

The ceramic foam filters prepared in accordance with Example I were used in the filtration of ductile iron by placing the samples in the runner system of a casting apparatus. The samples were 3 inches by 3 inches square and several tests were run with 150 lbs. ductile iron throughput in each case. The temperature of the alloyin the tests ranged between 2600°-2700° F. In all tests the casting times were less than 20 seconds, all filters rapidly primed with no apparent reduction in flow rates and the resulting castings were substantially free of visible defects when compared with unfiltered castings.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A cermic foam filter for use in filtering molten metal which comprises a filter body prepared from a ceramic slurry composition containing silicon carbide and a colloidal silica binder wherein said composition has a solids content of at least 50% silicon carbide and at least 3% silica, said filter body having an open cell structure with a plurality of interconnected voids surrounded by a web of said ceramic and a solids content of silicon carbide and silica in an amount such that said filter body is readily primable as a result of the wetting effect of the colloidal silica in the slurry and possesses improved thermal properties.

2. A filter according to claim 1 wherein the silica solids contained is 3-15%.

3. A filter according to claim 1 including alumina.

* * * * *